(12) United States Patent
Personey et al.

(10) Patent No.: US 10,039,271 B1
(45) Date of Patent: Aug. 7, 2018

(54) FLY FISHING LURE HAVING A TRAILING FEATHER PORTION

(71) Applicants: Ashley B. Personey, Andover, KS (US); Glenn A. Personey, Andover, KS (US)

(72) Inventors: Ashley B. Personey, Andover, KS (US); Glenn A. Personey, Andover, KS (US)

(*) Notice: Subject to any disclaimer, the term of this patent is extended or adjusted under 35 U.S.C. 154(b) by 0 days.

(21) Appl. No.: 15/719,558

(22) Filed: Sep. 29, 2017

(51) Int. Cl.
*A01K 85/08* (2006.01)

(52) U.S. Cl.
CPC .................... *A01K 85/08* (2013.01)

(58) Field of Classification Search
CPC ......... A01K 85/00; A01K 85/08; A01K 85/16
USPC ............ 43/42.24, 42.25, 42.26, 42.28, 42.37
See application file for complete search history.

(56) References Cited

U.S. PATENT DOCUMENTS

| | | | |
|---|---|---|---|
| 2,034,832 A | 12/1933 | Raycraft | |
| 2,093,585 A | 6/1936 | Woodhead et al. | |
| 2,078,798 A | 8/1936 | Hoefer | |
| 2,209,096 A | 7/1938 | Sherer | |
| 3,750,323 A * | 8/1973 | Weis | A01K 85/00 43/42.28 |
| 3,821,862 A | 7/1974 | Teeny | |
| 3,867,781 A * | 2/1975 | Wolfe | A01K 85/00 43/42.05 |
| 3,969,840 A * | 7/1976 | Charron | A01K 85/01 43/42.06 |
| 4,149,334 A | 4/1979 | Rogers | |
| 4,232,469 A * | 11/1980 | Shiverdecker | A01K 85/16 43/42.27 |
| 4,470,217 A * | 9/1984 | Adams | A01K 83/00 43/43.16 |
| 5,353,545 A * | 10/1994 | Masetti | A01K 85/08 43/42.25 |
| 5,839,219 A | 11/1998 | Evans et al. | |
| 6,430,866 B1 | 8/2002 | Chiaro | |
| 7,263,797 B1 * | 9/2007 | Trillo | A01K 85/01 43/17.6 |
| 7,322,150 B1 * | 1/2008 | Kent | A01K 85/00 43/42.25 |
| 2005/0223621 A1 | 10/2005 | Merlihan | |

* cited by examiner

*Primary Examiner* — David J Parsley
(74) *Attorney, Agent, or Firm* — Invention To Patent Services; Alex Hobson

(57) ABSTRACT

A fishing lure utilizes a substantial portion of a feather, such as a pheasant neck feather. A substantial portion of the feather, such as at least 75% of the entire length of the feather, is coupled to the lure, including a portion of the quill. A fishing lure may have one or more trailing feathers, or feathers that extend from the back of the hook, and may have one or more leading feathers, or feathers that extend forward from the hook. A trailing feather length, or length of feather from the hook turn may be at least 50% of the hook length and a leading feather length, may be at least 50% of the hook length. The feathers may be configured with their convex sides facing each other to produce a flared orientation wherein the feathers flare out and away from each other as they extend from the hook.

14 Claims, 3 Drawing Sheets

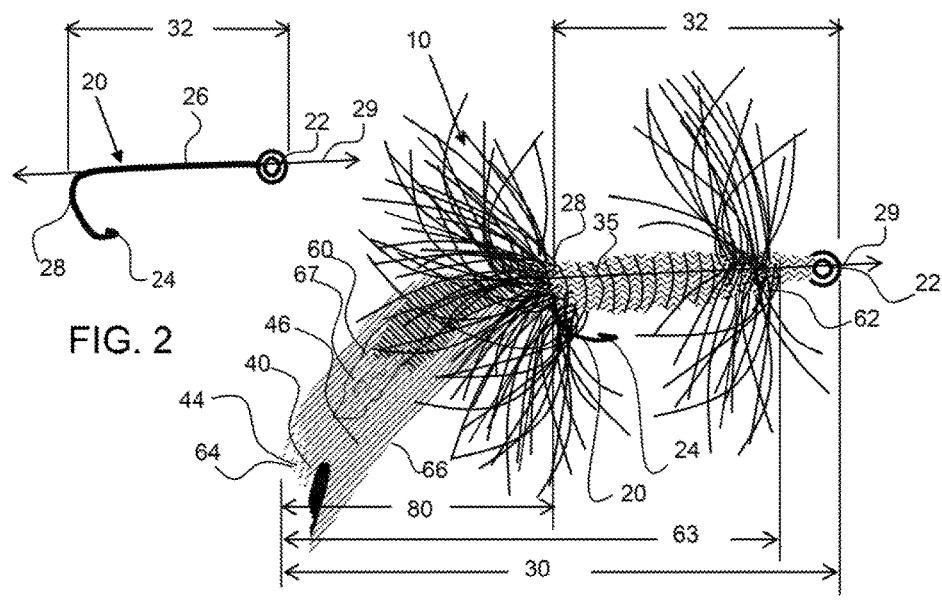
FIG. 2
FIG. 1
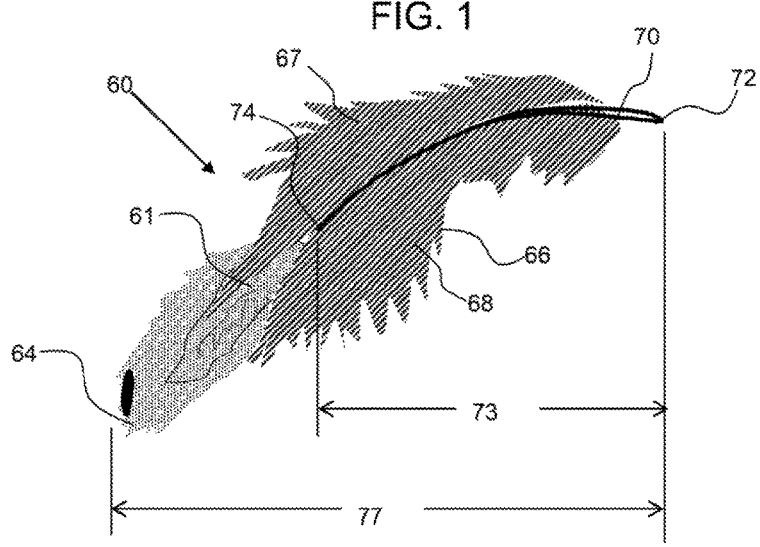
FIG. 3

FLY FISHING LURE HAVING A TRAILING FEATHER PORTION

BACKGROUND OF THE INVENTION

Field of the Invention

The invention relates to fishing lures and particularly fly fishing lures that utilize a substantial portion of a pheasant neck feather.

Background

Fishing is a popular sport and pastime that many people enjoy. Anglers like to use different types of baits and lures depending on the type of fish they are targeting, the conditions, environment and time of year. Fly fishing, including dry and wet fly fishing, utilizes a lure having a portion of a feather or foe feather attached to a hook. Dry fly fishing uses lightweight tackle and anglers float the dry-fly lure on the surface of the water. Wet fly fishing typically uses heavier hooks and tackle and the lure is submerged and pulled through the water to attract fish. In both dry and wet fly fishing, only a portion of the feather is utilized.

SUMMARY OF THE INVENTION

The invention is directed to a fishing lure that utilizes a substantial portion of a feather that is coupled to the hook of the lure. In an exemplary embodiment, a pheasant neck feather is used and a substantial portion, such as at least 75% of the entire length of the feather, is coupled to the lure, including a portion of the quill. An exemplary lure of the present invention comprising a feather coupled to the hook with an extended trailing feather portion, or portion of the feather that extends back from the hook and trails the hook when the lure is pulled through the water. An exemplary lure has a trailing feather length, or length of the trailing feather portion that, is at least 50% of the hook length, at least 75% of the hook length, or equal to or longer than the hook length, or any range of lengths between and including the lengths provided. An exemplary lure may have one, two or more, three or more, or four or more trailing feathers attached to the hook. The number of feathers attached will provide unique action of the lure when it is drawn through the water. An exemplary lure of the present invention comprises a leading feather, or a feather that extends forward from the hook, and may lead the lure when it is drawn through the water by the hook eye. A leading feather may extend forward from the hook eye, for example. An exemplary lure may have one or more, two or more, three or more, or four or more leading feathers coupled to the hook. A leading feather may have an extended leading feather portion, or a portion of the leading feather that extends from the hook and may extend forward the hook or hook eye. An exemplary lure has a leading feather length, or length of the leading feather portion that, that is at least 50% of the length of the hook, at least 75% of the hook length, or equal to or longer than the hook length, or any range of lengths between and including the lengths provided. This configuration of a lure comprising a feather or portion of a feather departs dramatically from conventional fly lures, wherein only a portion of a feather is attached to the hook and does not have any substantial portion that trails or leads the hook.

An exemplary feather of the present invention is a pheasant neck feather having a quill, feather portion and a plume portion that extends out from the quill. The quill has a length and extends from a quill tip to a quill extended end and the feather has a length from the quill tip to the extend feather end. A substantial portion of a feather may be used in an exemplary lure of the present invention, such as at least 50% of the feather length, at least 75% of the feather length, or as much as 90% of the feather length. An exemplary pheasant neck feather may have colors that attract fish, such as orange and black. An exemplary feather has a concave or cupped side of the feather, the inside portion of the feather when attached to a bird, and a convex side, the side usually facing out when attached to a bird and typically having more bright colors and feather than the inside concave side.

An exemplary lure comprises a hook with a hook eye, a hook turn and an extended end having a point and in some cases a barb. In some cases, barbs are prohibited and the hook may simply have a sharp extended end.

An exemplary lure may have the feathers configured with the concave and/or the convex sides facing outward, or away from the hook. The color of the convex side may be brighter and the convex side may have more features. However, the curvature of the feather can dramatically change the motion of the lure as it is pulled through the water. A lure with a single trailing or leading feather may spin as it is pulled through the water, due to the single spoon shaped feather. A lure with a plurality of trailing feathers may have more random action, wherein the combination of feathers slows and/or prevents spinning. The feathers may flex and bend or pulsate as the lure is pulled through the water. Trailing feathers with the convex sides facing each other, wherein the feathers flare out, may bend straight to lessen the concave shape of the feather when pulled by the angler and then rebound back to the original shape. This may produce lifelike action that attracts fish. Likewise, leading feather with the convex sides facing each other and toward the hook, may flex and bend backward when the lure is pulled through the water and then rebound back forward when the speed of retrieval is reduced or stopped. Again, this produces lifelike motion of the lure that will attract fish to strike.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 shows an exemplary lure comprising a trailing feather comprising a pheasant neck feather attached to a hook.

FIG. 2 shows a hook having a hook eye, hook turn, and hook barn.

FIG. 3 shows an exemplary pheasant neck feather.

Figure 4:
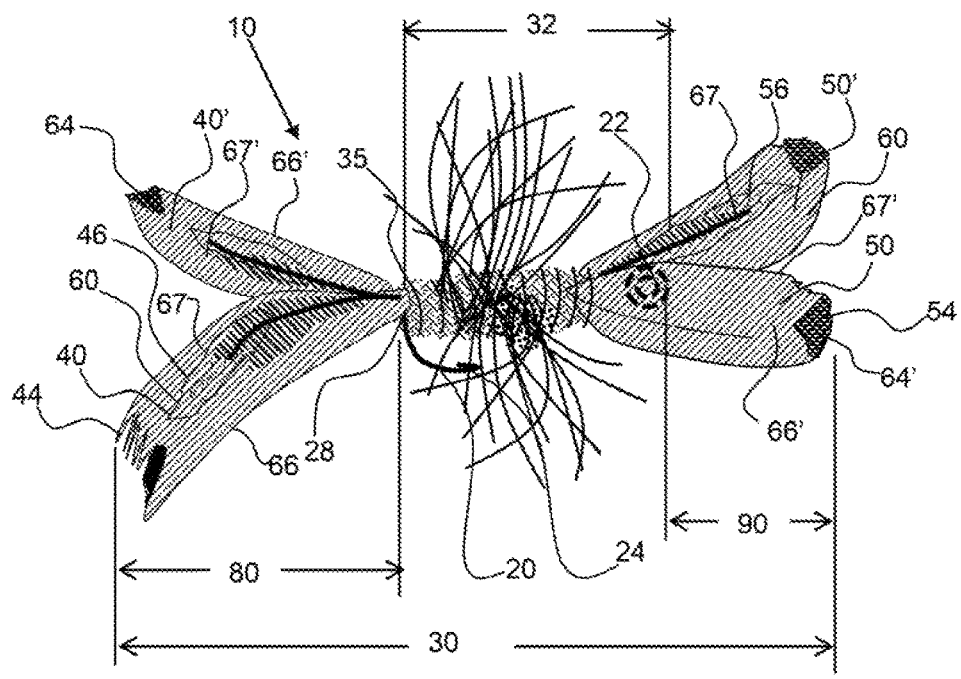
FIG. 4 shows an exemplary lure comprising two trailing feathers and two leading feathers, each being a pheasant neck feather attached to a hook.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring to FIGS. 1 to 3, an exemplary fishing lure 10 comprises a pheasant neck feather 60 attached to a hook 20, and the feather is a trailing feather 40, or feather that trails behind the hook when the lure is pulled through the water. The trailing feather 40 is attached to the hook by an attachment 35, such as an elongated member that wraps around the hook. The fishing lure has a length 30 from a hook eye 22 to an extended trailing end 44 of the feather, which is the extended feather end 64, or end opposing the quill tip 72. The hook has a length 32, along a length axis 29, from a hook eye 22 to a hook turn 28. As shown in FIG. 2, the hook 20 has a hook shaft 26 that extends from the hook eye to the hook turn 28. The length axis 29 of the hook is along the hook shaft 26 as shown. The hook turns to the extended end of the hook having a hook barb 24. Note, some hooks are barbless. A pheasant neck feather 60 is tied to the hook with a substantial portion of the length extending back from the turn of the hook. The trailing feather length 80, is the length of the extended trailing feather portion 46, or the length of the feather 60 from the hook turn 28 to the extended feather end 64, and this extended feather portion length is at least 50% of the hook length. The pheasant neck feature has a length 63 from the quill end 62 to the extended trailing end 64, when attached to the hook. The lure shown in FIG. 1 has a single trailing feather 40, a feather that extends back from the hook turn and trails the hook when the lure is pulled through the water by the hook eye 22. The single trailing feather is configured with the concave side 66 facing the hook, or hook barb, wherein the feather curves over the hook. This configuration may help conceal the hook form fish. The convex side 67 of the feather is facing out or away from the hook 20 and the concave side 66 of the feather 60 is attached to the hook.

As shown in FIG. 3, a pheasant neck feather 60 has a quill 70 extending a quill length 73 from the quill tip 72 to the quill extended end 74. The pheasant neck feature has a length 77 from the quill tip 72 to the extended feather end 64. The pheasant neck feather also has a feather portion 61 that may be a color that attracts fish to strike the lure, such as orange and black. The feather also has a plume portion 68 that extends from the quill 70 and this portion is attached to the hook shaft 26. The pheasant neck feather has a concave side 66 and a convex side 67. The concave side is cupped due to the curvature of the quill. The orientation of the feather on the lure will change the action of the lure as it moves through the water.

Figure 5:
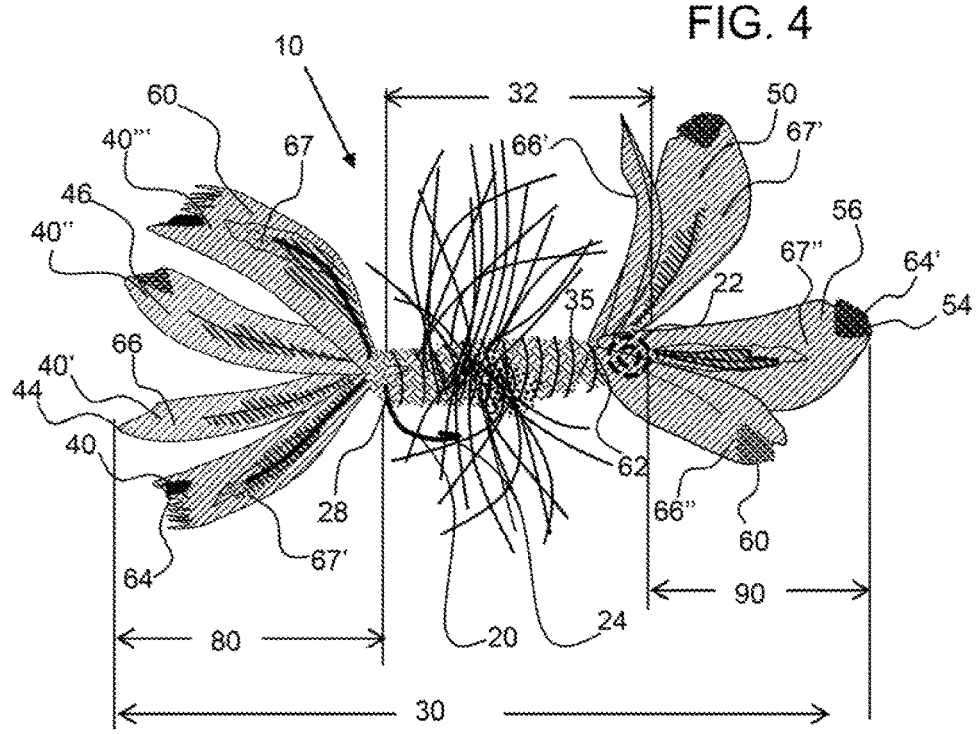
FIG. 5 shows an exemplary lure comprising four trailing feathers and four leading feathers, each being a pheasant neck feather attached to a hook.

Referring now to FIGS. 4 and 5, an exemplary fishing lure 10 comprises a plurality of pheasant neck feathers 60 attached to a hook 20. Each lure 10 comprises at least one trailing feather 40 and at least one leading feather 50. As shown in FIG. 4, the lure has two trailing feathers 40, 40' and two leading feathers 50, 50'. As shown in FIG. 5, the lure 10 has four trailing feathers 40-40''', and four leading feathers 50. The trailing feathers 40 extend from the hook turn 28 and trail the fishing hook when the lure is pulled through the water by the hook eye 22. The leading feathers 50 extend forward from the hook eye 22 and may lead the fishing hook when the lure is pulled through the water by the hook eye. The fishing lure has a length 30 from extended leading end 54 of the leading feathers to the extended trailing end 44 of the trailing feathers. The trailing pheasant neck feather 40 is tied to the hook with a substantial portion of the length extending back from the turn of the hook, or trailing the hook. The trailing feather length 80, is the length of the extended trailing feather portion 46 from the hook turn 28 to the extended trailing feather end 44. The leading feather length 90, is the length of the extended leading feather portion 56 from the hook eye 22 to the extended leading end 54. The combination of leading and trailing feathers provides a lure with unique action in the water. As shown in FIG. 4, the concave side 66 of trailing feather 40 faces the hook barb, or hook 24 and the concave side 66' of trailing feather 40' is facing away from the hook wherein the convex sides 67, 67' are facing each other. This configuration forms a flare set of feathers from the hook shaft or hook length axis. As shown in FIG. 4, both of the leading feathers are configured with the convex sides 67, 67' facing each other, again forming a flared configuration wherein the feathers flare away from each other as the extend away from the hook. The four trailing feathers shown in FIG. 5, are attached to the hook with the concave sides facing each other, forming a rounded space therebetween. The four leading feathers as shown in FIG. 15 configured with their convex sides facing each other and attached to the hook.

Figure 6:
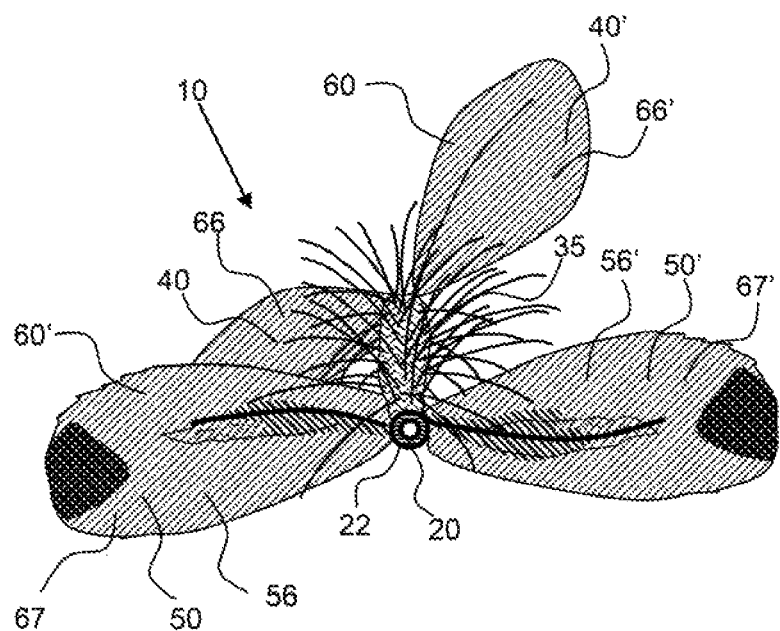
FIG. 6 shows a front view of an exemplary lure comprising two trailing feathers and two leading feathers, each being a pheasant neck feather attached to a hook.
Figure 7:
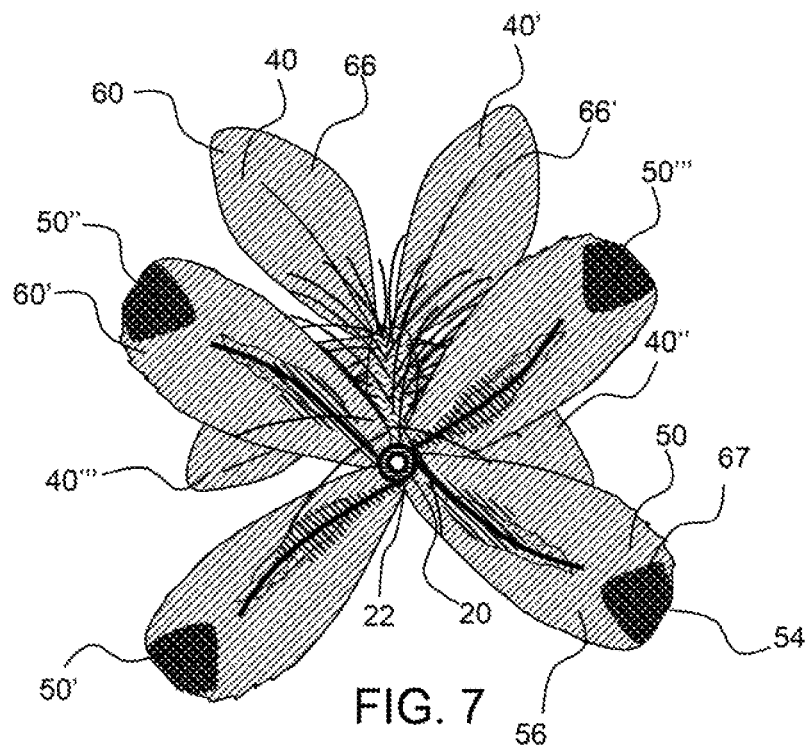
FIG. 7 shows a front view of an exemplary lure comprising four trailing feathers and four leading feathers, each being a pheasant neck feather attached to a hook.

Referring now to FIGS. 6 and 7, a fishing lure 10 comprises a plurality of pheasant neck feathers 60 attached to a hook 20. As shown in FIG. 6, the lure has two trailing feathers 40, 40' and two leading feathers 50, 50'. As shown in FIG. 7, the lure 10 has four trailing feathers 40-40''', and four leading feathers 50-50'''. The trailing feathers 40 extend from the hook turn 28 and trail the fishing hook when the lure is pulled through the water by the hook eye. The leading feathers 50 extend forward from the hook eye 22 and may lead the fishing hook when the lure is pulled through the water by the hook eye. As shown in FIG. 6, both of the trailing feathers are configured with the convex sides 66, 66' facing each other and both of the leading feathers are configured with the convex sides 67, 67' facing each other. Put another way, the feathers flare outward as they extend from the hook. Likewise, the lure shown in FIG. 7 has four trailing feathers and four leading feathers configured with the concave sides facing each other and toward the hook. The two leading feathers shown in FIG. 6 and the four leading feathers shown in FIG. 7 are configured with their convex sides facing the hook, or toward each other, thereby producing a flared feather orientation.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A lure comprising:
   a) a hook comprising:
      i) hook eye;
      ii) hook shaft; and
      iii) hook barb;
      iv) hook turn;
      v) hook length from the hook eye to the hook turn;
   b) at least two trailing feathers, each trailing feather comprising:
      i) a pheasant neck feather attached to the hook shaft and extend back from the hook turn;
      ii) a quill extending a quill length from a quill end to a quill extended end;
      iii) a length from a quill end to a feather extended end;
      iv) an extended trailing feather portion having an extended trailing feather length extending from the hook turn to the extended end of the trailing feather; and
      wherein the extended trailing feather length is at least 50% of the hook length
   c) at least two leading feathers, each leading feather comprising:
      i) a pheasant neck feather attached to the hook and extending forward of the hook eye:
      i) a quill extending a quill length from a quill end to a quill extended end;
      ii) a length from a quill end to a feather extended end; and
      wherein the lure comprises:
      iii) an extended leading feather portion having an extended leading feather length extending from the hook eye to the extended end of the leading feather; wherein the extended leading feather length that is at least 50% of the hook length.

2. The lure of claim 1, wherein the extended trailing feather length is at least 75% of the hook length.

3. The lure of claim 1, wherein the quill is attached to the hook shaft.

4. The lure of claim 1, wherein the at least two trailing feathers each have a convex side and a concave side, wherein a first trailing feather and second trailing feather are configured with said concave sides facing each other.

5. The lure of claim 1, wherein the at least two trailing feathers each have a convex side and a concave side, wherein a first trailing feather and second trailing feather are configured with said convex sides facing each other.

6. The lure of claim 1, comprising four trailing feathers, each comprising a pheasant neck feather.

7. The lure of claim 1, wherein the extended leading feather length is at least 75% of the hook length.

8. The lure of claim 1, wherein the at least two leading feathers each have convex side and a concave side, wherein a first leading feather and second leading feather are configured with said concave sides facing each other.

9. The lure of claim 1, wherein the at least two leading feathers each have convex side and a concave side, wherein a first leading feather and second leading feather are configured with said convex sides facing each other.

10. A lure comprising:
    a) a hook comprising:
       i) hook eye;
       ii) hook shaft; and
       iii) hook barb;
       iv) hook turn; and
       v) hook length from the hook eye to the hook turn;
    b) two trailing feathers, each comprising a pheasant neck feather attached to the hook shaft and extend back from the hook turn and comprising:
       i) a quill extending a quill length from a quill end to a quill extended end;
       ii) a length from a quill end to a feather extended end;
       iii) an extended trailing feather portion having an extended trailing feather length extending from the hook turn to the extended end of the trailing feather; wherein the extended trailing feather length is at least 50% of the hook length;
    c) two leading feathers, each comprising a pheasant neck feather attached to the hook and extending forward of the hook eye:
       wherein the leading feather comprises:
       i) a quill extending a quill length from a quill end to a quill extended end;
       ii) a length from a quill end to a feather extended end; and
       iii) an extended leading feather portion having an extended leading feather length extending from the hook eye to the extended end of the leading feather; and
       wherein the extended leading feather length that is at least 50% of the hook length.

11. The lure of claim 10, wherein each of the leading feathers has a convex side and a concave side, wherein a first leading feather and second leading feather are configured with said concave sides facing each other.

12. The lure of claim 10, wherein each of the leading feathers has a convex side and a concave side, wherein a first leading feather and second leading feather are configured with said convex sides facing each other.

13. The lure of claim 12, wherein each of the trailing feathers are configured with a concave side facing each other and wherein each of the leading feathers are configured with a convex side facing each other.

14. The lure of claim 12, wherein each of the trailing feathers are configured with a convex side facing each other and wherein each of the leading feathers are configured with a convex side facing each other.

\* \* \* \* \*